Inventors:
William D. Davis;
Thomas A. Vanderslice,
by John F. Ahern
Their Attorney.

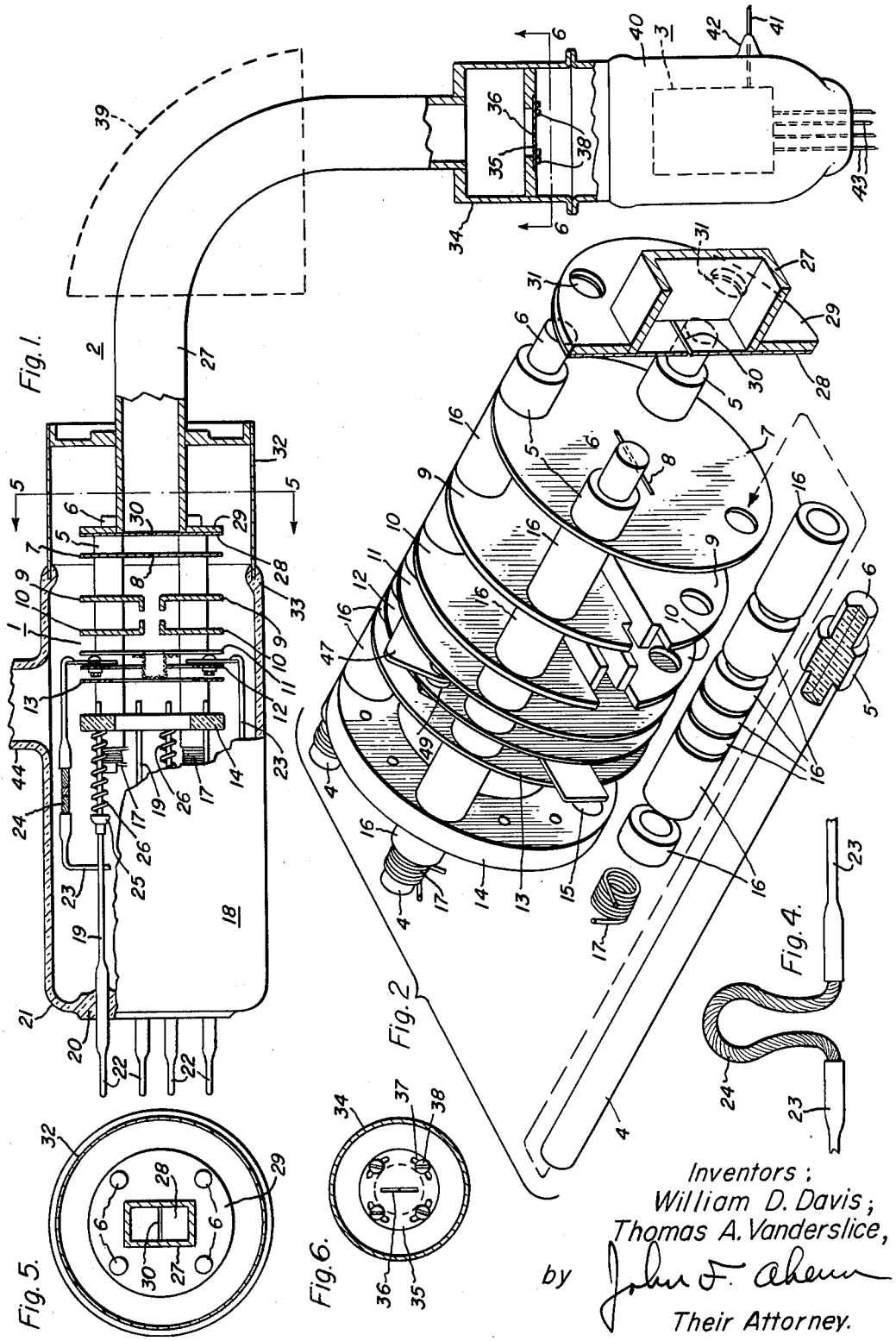
Jan. 18, 1966 W. D. DAVIS ET AL 3,230,362
BAKEABLE MASS SPECTROMETER WITH MEANS TO PRECISELY ALIGN
THE ION SOURCE, ANALYZER AND DETECTOR SUBASSEMBLIES
Filed Dec. 3, 1963 3 Sheets-Sheet 1
Inventors:
William D. Davis;
Thomas A. Vanderslice,
by
Their Attorney.

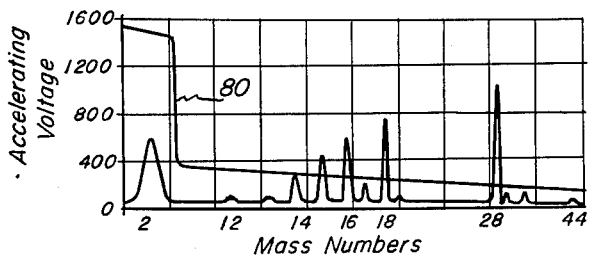
Fig. 11.
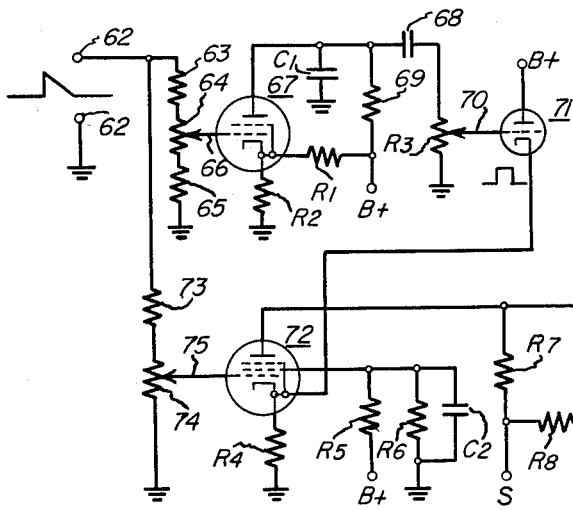
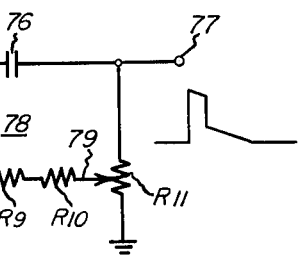
Fig. 10.
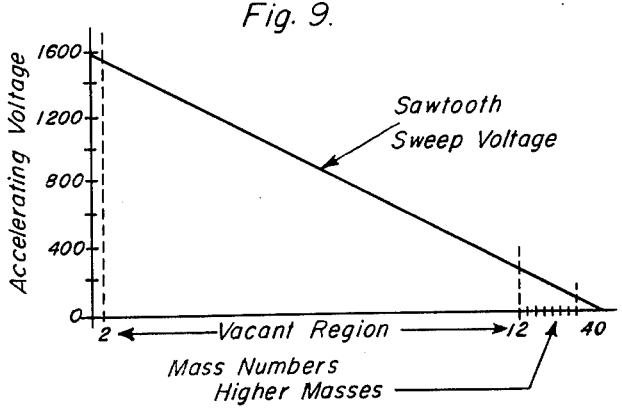
Fig. 9.
Inventors:
William D. Davis;
Thomas A. Vanderslice,
by John F. Ahern
Their Attorney.

United States Patent Office 3,230,362
Patented Jan. 18, 1966

3,230,362
BAKEABLE MASS SPECTROMETER WITH MEANS TO PRECISELY ALIGN THE ION SOURCE, ANALYZER AND DETECTOR SUBASSEMBLIES
William D. Davis, Schenectady, and Thomas A. Vanderslice, Scotia, N.Y., assignors to General Electric Company, a corporation of New York
Filed Dec. 3, 1963, Ser. No. 327,617
1 Claim. (Cl. 250—41.9)

This invention relates to improved gas analyzing instruments and more specifically to a portable mass spectrometer-type gas analyzing instrument which is particularly adapted for gas study in high vacuum applications. This application is a continuation-in-part of our copending application, Serial No. 109,596, filed May 12, 1961 and assigned to the assignee of the present application (now abandoned).

Gas analyzing instruments of the mass spectrometer type which are suitable for many applications are well known in the art. However, it has not been possible, with previously known mass spectrometer constructions, to build a small, portable instrument having adequate resolution and high sensitivity. This has placed a severe limitation on the utility of mass spectrometers. Previously known large size mass spectrometers are capable of the desired resolution and sensitivity because the alignment of the elements and subassemblies is easily accomplished and because the magnet which controls the beam of ions can be positioned with sufficient accuracy. In small size mass spectrometers, the alignment becomes much more critical because the margin of acceptable error is less and because the magnet cannot be positioned accurately enough to compensate for mis-alignment.

It has also been found that previous mass spectrometers are not suitable for high vacuum applications because the mass spectrometer itself influences the amount and composition of the gas to be analyzed. To permit the use of mass spectrometers in high vacuum measurements, it is necessary that the interfering particles be removed, for example by baking the system at high temperatures. In previous mass spectrometers, such baking destroys the alignment provided during assembly. Therefore, the system loses much of its sensitivity or else elaborate steps must be taken to realign it.

Accordingly it is an object of the present invention to provide a new and improved mass spectrometer which is small enough to be portable and yet capable of high resolution and sensitivity.

Another object of the present invention is the provision of a new and improved mass spectrometer which does not influence the amount or composition of the gas being analyzed.

A further object of the present invention is to provide a new and improved portable mass spectrometer which has high sensitivity and resolving power and is suitable for high vacuum applications.

It is also an object of the present invention to provide a new and improved mass spectrometer including means for sweeping the portion of the ion beam admitted to the detector through two ranges of masses while omitting an intermediate range.

A further object of the present invention is the provision of a mass spectrometer which is very precisely aligned before bakeout and which regains its alignment after bakeout.

Briefly stated, in accordance with one embodiment of the present invention, a mass spectrometer instrument is provided with a unitized ion source subassembly defining a first ion beam path having the respective elements thereof stacked and supported in accurately aligned spacial relationship over a plurality of insulating support rods. The instrument further comprises a mass analyzer tube subassembly which defines a second ion beam path and an ion detector means. In further accord with the invention, the mass analyzer subassembly is provided with fixed pre-aligned entrance and exit apertures and, also a part of the pre-aligned subassembly, means such as properly positioned apertures which define the points at which the mass analyzer subassembly is mounted to and aligned with the ion source subassembly, thus assuring proper alignment of the first and second ion beam paths. The ion source subassembly and mass analyzer are so constructed as to be bakeable without losing their precise alignment. The ion detector means is disposed at the exit aperture of the mass analyzer subassembly so that ions passing therethrough may be detected.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements and in which:

FIG. 1 is an elevation partly in section showing a mass spectrometer in accordance with this invention, FIG. 2 is a perspective view partly exploded illustrating the structure of the elements and the stacked spatial relationship thereof in the unitized ion source assembly, FIG. 3 is an exploded view of certain of the elements not shown in detail in the perspective view of FIG. 2, FIG. 4 is a detailed elevation view of the flexible loop lead structure of the ion source, FIG. 5 is a sectional view along the lines 5—5 of FIG. 1 illustrating in detail the analyzer tube and entrance aperture and their relationship to the ion source subassembly, FIG. 6 is a sectional view along the lines 6—6 illustrating a suitable adjustable mounting for the exit aperture member, FIG. 7 is a diagrammatic circuit diagram of a suitable arrangement for operation of the mass spectrometer of this invention, FIG. 8 is the mass spectrum of a gas sample obtained by a typical instrument in accordance with this invention showing the sensitivity, resolution and over-all operation thereof;

FIG. 9 is a schematic illustration of a sweep signal applied to a mass spectrometer superimposed on a schematic representaton of the output thereof;

FIG. 10 is a diagram of a circuit for sweeping the ion beam in a mass spectrometer according to the present invention; and, FIG. 11 is an illustration of the signal produced by the circuit of FIG. 10 superimposed on the mass spectrometer output produced thereby.

Figure 8:
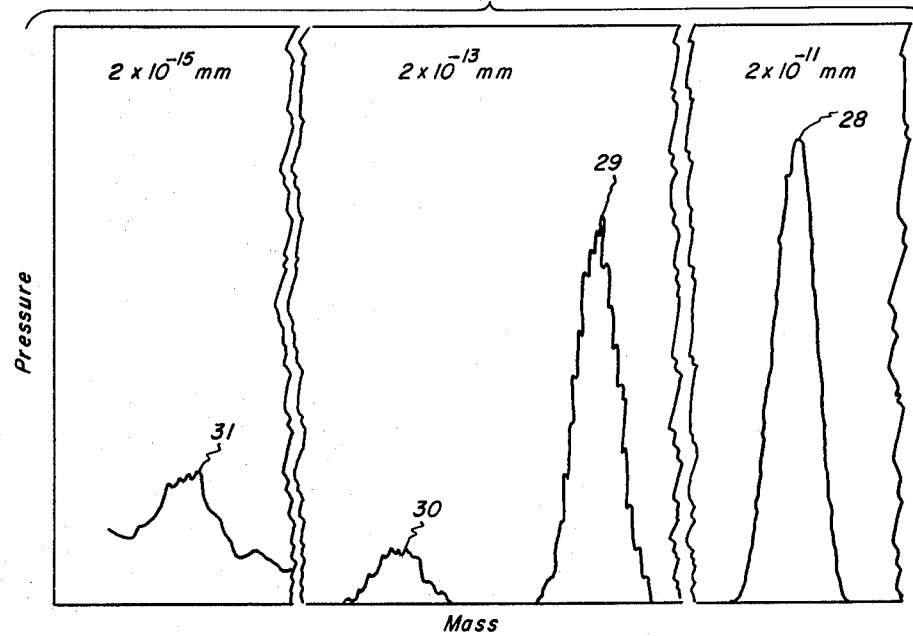

In FIG. 1 a mass spectrometer gas analyzer apparatus constructed in accordance with this invention comprises an evacuable assembly including an ion source subassembly 1, a mass analyzer tube subassembly 2, and an ion detector 3. The ion source subassembly 1 comprises a plurality of elements and spacers fitted over a plurality of support members to form a novel stacked array which provides for alignment between the various elements which make up the ion source and defines a first ion beam path and also provides a means of establishing and maintaining very precise alignment between the ion source and the respective collimating apertures of the analyzer tube subassembly 2.

The ion source may best be described by reference to the more detailed illustration shown by the perspective views in FIG. 2 and the exploded view of FIG. 3 of the drawing. In these figures there are shown four support rods 4 each having a collar 5 near one end thereof and an extension 6 thereabove. The ion source comprises an electron source, means for producing ions by electron bombardment of gas molecules and means for accelerating and collimating the ions so produced into a well defined ion beam. More particularly the ion source shown in the drawings comprises a plate 7 having a "defining" slit aperture 8 therein, two pairs of semi-circular focusing plates 9 and 10, an ion cage assembly 11, an electron source assembly 12, a pole piece assembly 13 and an annular support member 14. The elements 11, 12 and 13 are shown in more detail in FIG. 3. All of the elements 7–14 are provided with four symmetrically arranged holes 15 which are adapted to fit over the support rods 4. The dimensional tolerances of the various components are maintained sufficiently close that no alignment other than that provided by the support rods 4 is required or permitted.

The various elements are separated and suitably insulated from each other by means of a plurality of spacer members 16 which are also adapted to fit over the support rods 4. The spacer members 16 have an outside diameter larger than the diameter of the holes 15 in the various elements 7 to 14 so that the elements are suitably separated and supported thereby. The spacer members 16 have different lengths as required to provide the desired spacing between the respective elements. The elements 7 to 14 and their associated spacer members 16 are fitted over the four exactly located support rods 4 in the order shown and are secured thereto in a stacked array by means of a retaining spring 17 which fits over the end of each of the support rods 4 compressing the members together and forming a unit with all elements in accurate alignment.

As a particular feature of this invention, the various elements 7 to 13 of the ion source subassembly 1 are constructed of a conductive material which is capable of withstanding the temperatures encountered during the "bakeout," usually temperatures of at least 400° C., and which do not evolve any substantial quantity of gas. Molybdenum or stainless steel, for example, are particularly suitable materials for this purpose. Annular insulating member 14, spacer members 16 and support rods 4 are constructed of insulating materials capable of withstanding the same "bakeout" temperatures as the elements 7 to 13. Suitable materials for this purpose, for example, are alumina, Pyrex glass, quartz and the like. Conveniently, for example, the annular support member 14 may be constructed of alumina, the support rods 4 and spacer members 16 of quartz, and the conducting elements 7 to 13 of molybdenum.

As described hereinbefore the various members which comprise the ion source subassembly are stacked and maintained in place on the insulating supports rods 4. Since very close dimensional tolerances may be maintained between the various components, all of the elements of the ion source subassembly may be provided in very accurate alignment by virtue of the stacking arrangement on the support rods 4 with no further alignment procedures being required.

Referring again to FIG. 1 ion source subassembly 1 is shown enclosed within an evacuable envelope 18 and is supported therein by a plurality of support pins 19. One end of each of the support pins 19 is fitted into apertures provided therefor in the annular support member 14 of the ion source unit. The other ends of the pins 19 extend through and are hermetically sealed to a base member 20 which is adapted to be sealed to the end 21 of envelope 18. The extensions 22 of support pins 19 may be further utilized as external connections for applying the different potentials to the various elements 7–13 of the ion source subassembly 1. To this end, leads 23 are provided and have one end connected to the support pins 19 and the other ends connected to the various elements of the ion source, so that the particular operating voltages connected to the pin extensions 22 are applied through the support pins 19 and the leads 23 to the respective element. To allow for some movement of the ion source subassembly on the support pins 19 during the final assembly of the entire apparatus, the leads 23 are further provided with the flexible loops 24 formed therein. The flexible loops 24 shown in more detail in FIG. 4.

To assure a more stable support for the ion source array within the envelope 18, at least two of the support pins 19 may be provided with a flange or cup-like collar 25 and a coil spring 26. The spring 26 is inserted over the support pin 19 and, when compressed against the surfaces of the annular support member 14, exerts a force between the flange 25 and member 14 and provides a more stable support for the ion source to maintain the stacked relationship of the components thereof.

It is particularly noted that construction of the ion source assembly in the above described manner and by using materials which can withstand bakeout temperatures, the influence of mass spectrometers as previously known on the amount and composition of the gas to be analyzed in high vacuum applications is substantially reduced or eliminated. The above described construction is important to this feature since, during bakeout, the various materials used expand at varying rates. However, due to the spring-biased spacer assembly, the ion source subassembly returns to the precise alignment initially provided after bakeout has been completed. That is, the unit may be constructed and properly aligned before bakeout without fear of destroying the alignment during bakeout.

In further accord with the present invention, a second ion beam path is defined by the mass analyzer tube subassembly 2. This subassembly includes sector tube 27, having a plate 28 mounted to a suitable annular support member 29 at one end thereof. Plate 28 is provided with a slit aperture 30 and, as a particular feature of the present invention, both the plate 28 and annular support member 29 are provided with four precisely positioned holes which fit over the extensions 6 of the support rods 4. The relationship of the plate 28, annular support 29 and mass analyzer tube 27 is shown in more detail in the exploded portion of FIG. 2 and the sectional view of FIG. 5.

A housing 32 is provided on tube 27 near the plate 28 and is adapted to be hermetically sealed to the end 33 of envelope 18 when the plate 28, support member 29 and the associated mass analyzer tube 27 are suitably fitted to the extensions 6 of the four support rods 4. The opposite end of tube 27 terminates in a housing 34 into which is mounted a plate 35. As is shown in more detail in FIG. 6, the plate 35 is provided with a slit aperture 36 and a means for adjustably mounting the plate within the housing to enable accurate alignment between the aperture 30 and the aperture 36 within the mass analyzer tube subassembly 2. This adjustable mounting may be conveniently accomplished, for example, by providing the plate 35 with a plurality of slotted openings 37 and by mounting the plate into the housing 34 by means of screws 38 which extend through the openings 37. The slotted openings 37 allow for some adjustment of the plate 35. The two apertures 30 and 36, referred to hereinafter as the "entrance" and "exit" apertures, respectively, are very precisely aligned perpendicularly to the plane of the sector tube 27 during the fabrication of the mass analyzer subassembly 2 by means such as a Gaertner bench-type optical spectrometer.

The novel structure of the portable spectrometer instrument of this invention provides for very precise and permanent alignment between the first ion beam path defined by the collimating apertures of the ion source and the second ion beam path defined by the exit apertures of the mass analyzer assembly. More particularly, there is an extremely accurate alignment provided during fabrication of the mass spectrometer instrument between the "defining" aperture 8 of plate 7 and the entrance aperture 30 of mass analyzer assembly 2. This accurate alignment contributes to the over-all high sensitivity and good resolution thereof.

For example, in the prior art small size mass spectrometers known to us, the ion source itself usually includes one or more collimating apertures. The mass analyzer tube itself, however, contains only the exit or "collector" aperture. Thus, although in such instruments very accurate alignment may be provided between the various elements and collimating apertures of the ion source during the fabrication thereof, there is no accurate alignment provided between the collimating apertures of the ion source and the exit aperture of the mass analyzer tube. Attempts are made after fabrication of the instrument to achieve as satisfactory alignment as possible between the collimating apertures of the ion source and the exit apertures of the mass analyzer tube. Such adjustment has proven extremely difficult and in many cases is almost impossible of attainment so that the resulting prior art small size mass spectrometers of inexpensive construction have been deficient in both sensitivity and resolution. Further, once such an instrument has been adjusted for best operation great care must be exercised to assure that the critical adjustment is not upset.

In the mass spectrometer of this invention, as shown hereinbefore, a very accurate alignment is provided between the entrance aperture 30 and the exit aperture 36 of sector tube 27 during the construction of the mass analyzer 2. Further, means are provided for mounting the sector tube 27 with the prealigned apertures therein on to the ion source assembly itself. It will be readily apparent, therefore, that the collimating apertures of both the ion source assembly and the mass analyzer assembly are in very precise alignment. This alignment is possible in accordance with this invention since the plate 28 containing the entrance aperture 30 is mounted by means associated with the ion source assembly 1 and is thus in very accurate registry with the elements 7–13 of the ion source. For example, the holes 31 of the plate 28 and its associated support member 29 may be readily adapted to fit over the extensions 6 of the four support rods 4. The collars 5 insulatingly support and space the plate 7 from the plate 28. Again, the dimensional tolerances of the support rods, extension 6 thereof and the holes 31 in the plate 28 are held sufficiently close to assure that this precise alignment is established.

Also in accord with the present invention, the mass analyzer subassembly is constructed of materials which permit bakeout without destroying the alignment. For example, stainless steel is an appropriate material. It is important that the various elements have similar expansion rates so that the alignment is maintained despite bakeout. Since the apertures 30 and 36 of analyzer tube assembly 2 are aligned during the fabrication thereof and plate 28 is mounted to, and aligned with, the ion source unit by mounting to the support rods 4, the collimating apertures of the mass spectrometer instrument of this invention are provided and maintained in extremely accurate alignment. For this reason a much greater quantity of the ions produced by the ion source are directed to the ion detector means 3. The resulting mass spectrometer, therefore, is of small size, inexpensive construction and is found to possess extreme sensitivity and resolution.

The proper external magnetic field for deflecting the ion beam is provided by suitable magnets whose pole pieces are designated diagrammatically by the dashed line 39. The magnetic field so provided serves to separate ions in accordance with their different mass-to-charge ratios in well-known manner. For example, ions of a larger m./c. ratio are not deflected by the external magnetic field as much as ions of a lighter mass, the charge on the ion being constant. Due to the fringing of the external magnetic field, best focusing of the ion beam has been found to be obtained if the edges of the magnet pole pieces 39 are shifted about one gap length away from the calculated position. The best position of the instrument in the magnetic field may be quickly and easily determined during operation thereof.

The remaining end of the housing 34 is sealed to one end of the evacuable envelope 40 which encloses the ion detector means 3. Ion detector 3 may include means well-known in the art for detecting ions and developing an output voltage therefrom. For example, the ion beam may be made to impinge upon a target or collector electrode and an output voltage developed across a suitable resistance connected thereto which may be amplified and recorded in a manner and by means well-known in the art. For still greater sensitivity, however, it is preferred to utilize an electron multiplier device. For example, a multistage electron multiplier is particularly suitable for use in the mass spectrometer of this invention.

The use of an electron multiplier device as the ion detector has been found to increase the output current by a factor of about $10^6$ to $10^8$ which, with allowance for the "dark current" of the multiplier device, provides for a net gain in sensitivity of the mass spectrometer of about $10^3$–$10^5$. An additional advantage of the electron multiplier ion detector is that the signal level is raised sufficiently thereby to substantially eliminate the problems, such as pick-up drift and long response time, usually associated with measuring very low currents. A suitable electron multiplier for use as the ion detector of this invention, for example, may be a 10 stage Dumont No. 6467 commercial photomultiplier. Other electron multiplying devices may, however, be used.

When a commercial electron multiplier device is utilized, the glass envelope thereof may be removed and the multiplier structure mounted on a 10-lead glass stem in a manner well-known to those skilled in the art. The output lead 41 is brought out through an aperture 42 in the side of envelope 40, to avoid leakage currents, and is hermetically sealed thereto. The glass stem, having the electrodes 43 which are connected to the various stages of the electron multiplier device extending therethrough, is sealed to the remaining end of the envelope 40. A tubulation is provided for the evacuable assembly, as for example, tubulation 44 on evacuable envelope 18, for connection to a suitable pumping apparatus to obtain the required low operating pressure therefor.

Figure 3:
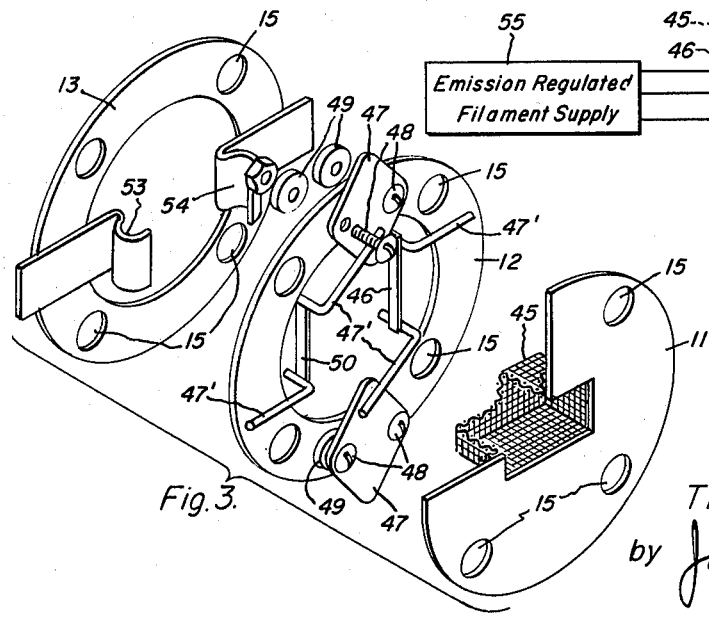

Ions are produced within a mesh cage 45, shown in detail in FIG. 3, by electron bombardment of gas molecules therein. The electrons may be emitted, for example, from a hot filament 46 mounted to the electron source assembly plate 12 by means of anchor members 47–47'. For example, anchor member 47 may be insulatingly mounted to the plate 12 by two screws or bolts 48 and ceramic spacers 49. Anchor member 47' may be connected to plate 12 in any convenient manner as by clamping, welding or the like.

Filament 46 may be constructed of any suitable electron emissive material as, for example, tungsten, tantalum or the like. The spacing between the filament assembly 12 and the ion cage assembly 11 in the stacked array is such as to assure that the filament 46 is disposed in close proximity to one side of the mesh cage 45. Preferably, for most efficient operation the filament 46 may be disposed proximate the smaller dimension of the mesh cage 45.

Since the filament of the ion source assembly is subject to "burn-out" or other failure during operation of the instrument, electron source assembly 12 may be very conveniently provided with a spare filament 50. Filament 50 may be mounted similar to that of filament 46 on the opposite end of electron source assembly plate 12 so as to be also in close proximity to a side of the mesh cage 45 of ion cage assembly 11. Alternatively, means may be provided for allowing for the replacement of the filament without disassembling the entire instrument.

Appropriate operating potentials are applied to the respective elements 7–13 of ion source assembly 1 by suitable connection of the extensions 22 of the appropriate support pins 19 to the required source of voltage.

For some applications and as an aid in still further increasing the sensitivity of the instrument, an external magnetic field may be provided parallel to the electron beam for purposes of collimating the electrons. This external magnetic field may be produced, for example, by a small permanent magnet of the horseshoe type (not shown). The external magnetic field, produced by such a permanent magnet, may be aided by the provision of pole pieces disposed in close proximity to the electron source. To this end pole pieces 53 and 54 may be provided on pole piece assembly 13 in back of, and in close proximity to, the respective filament 46 and 50. The pole pices 53 and 54 are shown in detail in FIG. 3. While for a great many applications such an external magnetic field is desirable, it is to be understood that it is not necessary to the successful operation of the mass spectrometer of this invention.

The operation of mass spectrometer type gas analyzer instruments of the general type to which this invention is directed is well-known in the art. The ions produced within the mesh cage 45 by bombardment of gas molecules by the electrons emitted from the hot filament 46 are subjected to the combined influence of the electrostatic field of the two pairs of focusing plates 9 and 10 and the defining plate 7. The combined action of these elements causes the ions produced within the mesh cage 45 to be accelerated to very high velocities and formed into a well defined "ion beam" that passes through the aperture 8 in defining plate 7, the entrance aperture 30 of plate 28 and into the influence of the external magnetic field associated with the section tube.

As is well-known, the ions in the accelerating field, produced by the combined influence of the elements 7 to 10, acquire equal kinetic energies and thus their velocities are inversely proportional to the square root of their masses. The ions moving at high velocity constitute an electric current and a magnetic field is produced simultaneously by the moving ions. The magnetic field caused by the moving ions is acted upon by the external crossed magnetic field which causes deflection of the ions in the sector tube. The magnitude of the magnetic field and the potentials which are employed to develop the accelerating field may be controlled such that ions representing only one mass to charge ratio may pass through the sector tube of mass analyzer tube assembly 2 and through the exit aperture 36 thereof. This is due to the fact that ions of different masses are deflected by different amounts by the action of the crossed magnetic field associated with the mass analyzer tube asembly 2. A number of ions of any given mas are thus caused to pass through the exit aperture 36 of the plate 35 where they are suitably detected by ion detector means 3. The output of the ion detector means 3 may be connected to an electrometer, an oscilloscope, or other suitable recording instrument.

Figure 7:
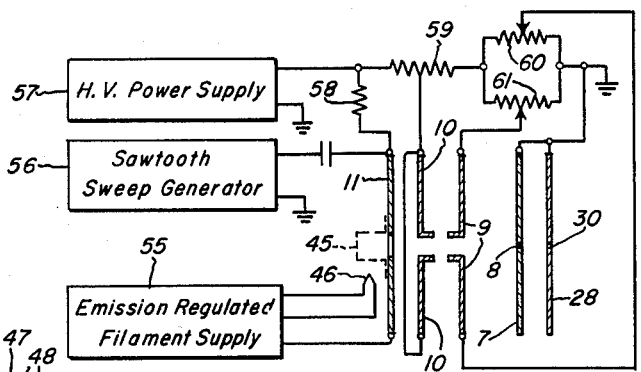

Typical operating requirements for the ion source assembly 1 are: 500 to 3000 volts ion accelerating voltage; 1 milliampere electron emission current at 75 volts; and 8 amperes filament current at 2 volts. When an electron multiplier device is utilized as the ion detector the device may be operated at about 200 to 300 volts per stage and the output current thereof determined by an electrometer capable of reading as low as $10^{-13}$ amperes. For slow sweep speeds or manual operation of the mass spectrometer instrument any well-known circuit means for providing these potentials may be employed. Suitable circuit means for providing these requirements are well-known by those skilled in the art. In addition, increased sensitivity may be achieved by employing well-known pulse counting techniques; however, since the signal is usually well above the noise level of the electron multiplier this is usually not necessary.

Where rapid sweep rates are required, a sawtooth voltage may be superimposed on the direct current accelerating voltage and the output of the electron multiplier applied to an oscilloscope. It will be readily apparent that for a great many applications it is extremely desirable to obtain the direct display of the mass spectrum on an oscilloscope. In FIG. 7 there is shown a schematic circuit diagram suitable for this purpose.

In FIG. 7 there is shown diagrammatically the elements 7–11 respectively and the filament 46 only of element 12 of ion source assembly 1, and entrance aperture plate 28 associated therewith, a regulated filament supply 55, a sawtooth sweep generator 56 and a high voltage power supply 57. The appropriate operating potentials to the ion cage assembly 11 and the two pairs of focusing plates 9 and 10 are supplied from high voltage supply 57 through a voltage dividing network including the appropriate resistances 58, 59, 60 and 61 respectively, in known manner.

Regulated filament supply 55 should be capable of supplying up to about 5 milliamperes emission current and about 10 amperes heating current at 5 volts. Regulated filament supply 55 should further provide a filament current having an alternating current component of about 1% or less and should not substantially load the sawtooth sweep generator 56. To this end, therefore, the capacitance to ground of filament supply 55 should be low.

Sweep generator 56 should supply a positive or negative slope sawtooth waveform of up to about 2000 volts amplitude and rate of about 1 to 0.001 second. For a sweep of about 150 volts or less it is very convenient to utilize the sweep voltage obtained from an oscilloscope, such as the Tektronix model 545, for example. This has the added advantage that the sweep source is automatically synchronized with the display on the oscilloscope.

The extremely good resolution of the mass spectrometer instrument of this invention, as well as the overall performance thereof at low pressures, may be appreciated by reference to FIG. 8. FIG. 8 illustrates a typical mass spectrum for carbon monoxide obtained by a typical mass spectrometer instrument of this invention. The expected abundance ratios of the masses 28, 29, 30 and 31 corresponding to $C_{12}O^{+}{}_{16}$, $C_{13}O^{+}{}_{16}$, $C_{12}O^{+}{}_{18}$ and $C_{13}O^{+}{}_{18}$ respectively should be about 100:1:0.2:0.002.

As shown in FIG. 8 the intensity peaks for mass 28, 29, 30 and 31 correspond closely with the expected abundance ratios. For example, carbon monoxide mass 28 has isotopes at mass 29, 30 and 31. The peak for the mass 31 isotope is approximately one fifty-thousandths as large as the peak for mass 28. If the mass 28 peak from carbon monoxide corresponds to a pressure of $10^{-8}$ millimeters of mercury, the mass 31 peak therefrom corresponds to $2 \times 10^{-13}$ millimeters of mercury. Similarly if the mass 28 peak is $10^{-11}$ millimeters of mercury then the mass 31 peak is $2 \times 10^{-16}$ millimeters of mercury. It is evident from FIG. 8, therefore, that partial pressures as low as about $10^{-17}$ millimeters of mercury can be detected. No other mass spectrometer type gas analyzing instrument of comparable size and ease and simplicity of construction is capable of measuring such low pressures while at the same time providing as satisfactory mass resolution.

Good focusing of the resolved ion beam is indicated by the fact that the width of the base of the mass 29 peak illustrated in FIG. 8 is approximately equal to the theoretical value of 0.21 mass units or 0.014 inch which corresponds to the sum of the source and exit apertures of the particular instrument employed. With equivalent performance at higher masses, the dispersion would be just equal to the peak width at about mass 140. The mass spectrometer instrument of this invention, therefore, is capable of measuring pressures as low as about $10^{-17}$ millimeters of mercury and resolving adjacent masses to about mass 140.

The maximum possible sweep rate is governed by several factors such as for example, the rise time of the electron multiplier device utilized as the ion detection means and the overall bandwidth associated with the amplifier and the oscilloscope. To faithfully reproduce the mass peak, the output of the multiplier must be terminated in a resistance sufficiently small to give a decay time less than that of the signal itself. For example, for sweep rates of 1 millisecond per mass at mass 28, a value of 1 megohm is sufficient but for sweep rates of 1 microsecond per mass this resistance must be reduced to a value of about 10,000 ohms. Some of this loss of signal voltage may be compensated for by increased amplification, however, as the number of ions collected per sweep decrease, a point is reached where only individual pulses are produced. When this point is reached the familiar well defined mass peaks as shown in FIG. 8 degenerate into a grouping of pulses and the sensitivity for very small signals decreases.

In conducting measurements with the spectrometer of the present invention, it has been found that many spectra of interest have ranges containing ion species which are separated by vacant areas. For example, several spectra only include ion species up to mass 40 but do not include ion species between mass 2 and mass 12. Therefore, if the circuit sweeps the beam through the complete spectrum, a large portion of the sweep time is wasted on the vacant region and the significant readings between mass 12 and mass 40 are crowded into a very short time interval. This situation is illustrated in FIG. 9. As a solution to this problem, and as a particular feature of the present invention, the sawtooth sweep generator 56 may be replaced by the circuit shown in FIG. 10. The input at terminals 62 is a sawtooth wave obtained in a conventional manner. This input is developed across resistors 63–65 and applied through tap 66 to fire thyratron 67 which drops the plate voltage from B+ to nearly zero. The time duration of the thyratron operation is controlled by the setting of tap 66. The square pulse is applied through amplitude-adjusting tap 70 to cathode follower 71 and then to the cathode of amplifier tube 72.

The input wave is also developed across resistors 73 and 74 and applied through tap 75 to the grid of amplifier 72 which superimposes the square pulse onto the sawtooth. The resultant wave is passed through coupling capacitor 76 to output terminal 77. The D.C. level of the output is adjusted by the restorer circuit 78 including tap 79 so that the entire wave is positive.

The output, as illustrated at output terminal 77, is a sawtooth wave with a first portion occurring at a high level and a second portion at a low level. The first portion provides the sweep necessary to focus ions of mass 2 on the detector while the second focusses ions of mass 12–40. The output of the circuit of FIG. 10 is shown in FIG. 11 at 80 superimposed on a spectrum 81 measured utilizing this circuit. This illustrates the spreading of the higher mass number readings over most of the time interval of the original sawtooth.

As a specific example, the following values have been found to be appropriate for the circuit of FIG. 10:

| | |
|---|---|
| Input | Sawtooth pulse, +140 v. from Tektronix 545 oscilloscope. |
| B+ | 300 volts. |
| S | 4 kilovolts, 5 milliamps. |
| 63 | 100K ohm. |
| 64 | 100K ohm. |
| 65 | 4.7K ohm. |
| 67 | 2050 Thyratron. |
| $R_1$ | 3K ohm. |
| $R_2$ | 80K ohm. |
| $C_1$ | 500 µµfd. |
| 68 | 6 µfd. |
| 69 | 1 megohm. |
| $R_3$ | 1 megohm. |
| 71 | ½ 12AU7. |
| 72 | 6BG6G/A. |
| 73 | 100K ohm. |
| 74 | 25K ohm. |
| $R_4$ | 4.7K ohm, 1 watt. |
| $R_5$ | 47K ohm. |
| $R_6$ | 75K ohm. |
| $C_2$ | 10 µfd. |
| 76 | 1 µfd., 5 kv. |
| $R_7$ | 390K ohm, 50 watt. |
| $R_8$ | 1.5 megohm. |
| $R_9$ | 1.5 megohm. |
| $R_{10}$ | 2.2 megohm. |
| $R_{11}$ | 5 megohm. |

These values are set forth in order to aid in reproducing the circuit illustrated and its effect only. They are not to be construed in a limiting sense to affect the appended claims.

The pulse width of the square wave, which is, in turn, the width of the first portion of the output, is adjusted by means of tap 66 while its amplitude is adjusted by tap 70. The amplitude of the sawtooth and the D.C. level of the output wave are respectively adjustable by taps 75 and 79. Thus, the output can be set to accomplish the result shown in FIG. 11. In the specific example set forth above, the square pulse amplitude was adjustable from zero to 1600 volts while the sawtooth portion was adjustable from zero to 800 volts.

It is noted that the details of this circuit set forth above may be varied while remaining within the scope of the present invention, the specific embodiment being only exemplary.

While only certain preferred features of the spectrometer assembly and associated sweep circuit of the present invention have been shown by way of illustration, many modifications and changes will occur to those skilled in the art. It is, therefore, to be understood that the appended claim is intended to cover all such modifications and changes which fall within the true spirit and scope of this invention.

What we claim as new and desire to secure by Letters Patent of the United States is:

In a bakeable mass spectrometer comprising an evacuable assembly having first, second and third evacuable portions and including therein an ion source subassembly, an analyzer subassembly and an ion detector means respectively, the combination comprising: a unitized ion source subassembly adapted to be stably supported within said first evacuable portion and including in stacked insulated and aligned relationship on a plurality of insulated support rods forming a common mounting and aligning means an annular insulated support member, an ion producing member, an electron source member, a pair of focusing members, a collimating member having a slit aperture therein, means for applying appropriate operating potentials to the respective members and spring means biasing said elements into aligned relationship on said support rods so as to return said assembly to proper alignment after expansion and contraction due to bakeout; an analyzer subassembly adapted to be sealed to said first evacuable portion and including a sector tube having at one end thereof a first plate having a slit aperture therein and near the other end thereof a second plate having a similar slit aperture therein, said slit apertures being in precise alignment within said sector tube, said first plate being adapted to be mounted directly upon the plurality of insulated support rods of said ion source assembly establishing accurate common alignment between said collimating slit apertures thereof and the entrance and exit apertures of said sector tube, said sector tube and said first and second plates being composed of a metallic material so that the expansion and contraction thereof due to temperature are coextensive; an ion detecting means supported within said third evacuable portion including a multistage electron multiplier device; and means for applying appropriate operating potentials to the respective elements of said electron multiplier device and for obtaining an output therefrom; said evacuated assembly being adapted to be baked out to remove gaseous particles therefrom whereby said ion detecting means is affected only by particles from an analyzed gas during operation.

References Cited by the Examiner

UNITED STATES PATENTS

| | | | |
|---|---|---|---|
| 2,312,203 | 2/1943 | Wallace | 328—185 |
| 2,660,677 | 11/1953 | Nier | 250—41.9 |
| 2,733,343 | 1/1956 | Inghram et al. | 250—41.9 |
| 2,756,341 | 7/1956 | White | 250—41.9 |
| 2,784,317 | 3/1957 | Robinson | 313—63 X |
| 2,834,888 | 5/1958 | Norton | 250—41.9 |
| 2,903,584 | 9/1959 | Jaffe et al. | 328—185 |
| 2,911,531 | 11/1959 | Rickard et al. | 250—41.9 |
| 2,969,461 | 1/1961 | Morgan | 250—41.9 |

RALPH G. NILSON, *Primary Examiner.*

WALTER F. LINDQUIST, *Assistant Examiner.*